United States Patent Office 2,980,322
Patented Apr. 18, 1961

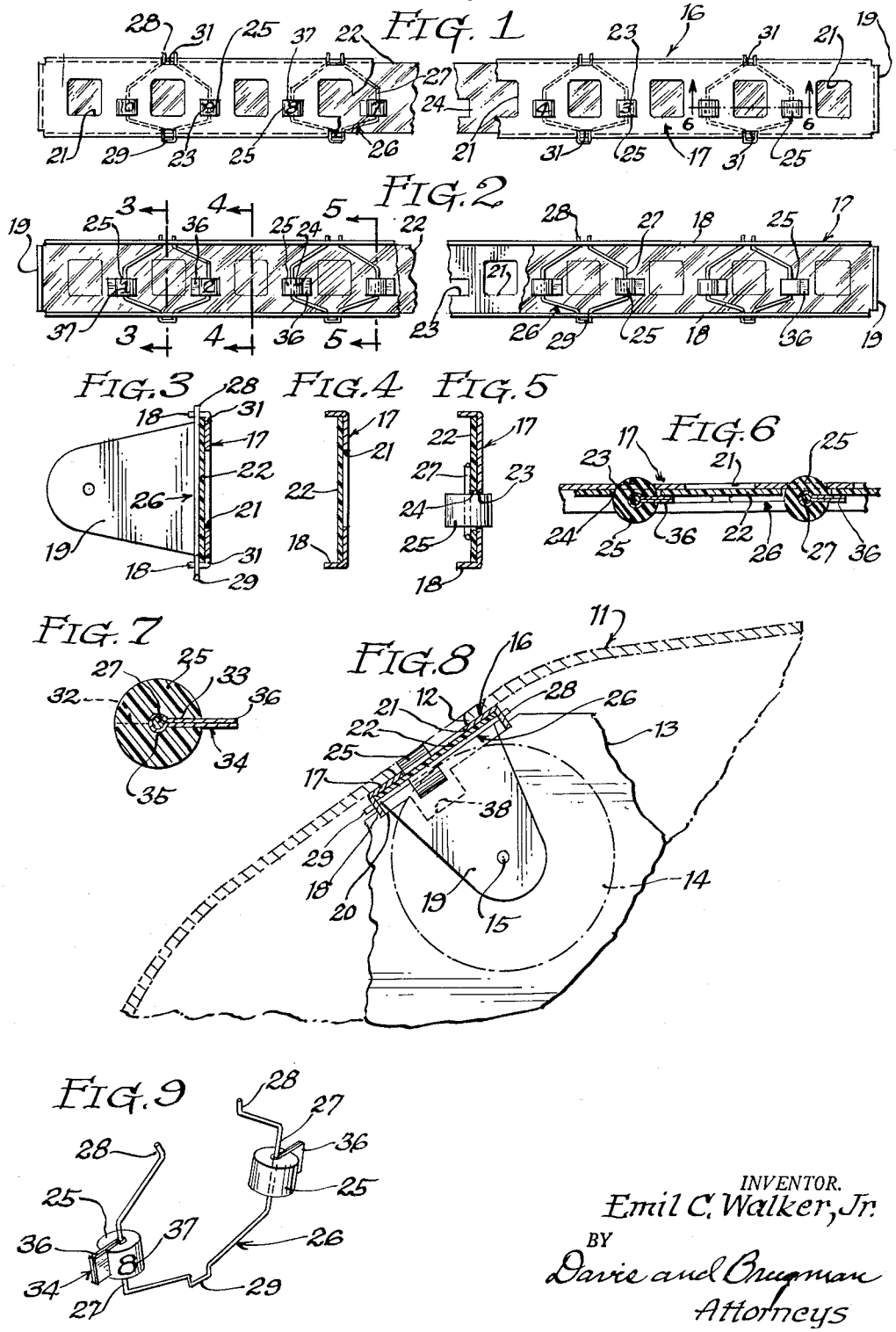

2,980,322

DECIMAL POINT INDICATOR MECHANISM FOR REGISTERS

Emil C. Walker, Jr., Woodstock, Ill., assignor to Comptometer Corporation, a corporation of Illinois Filed May 14, 1956, Ser. No. 584,813

14 Claims. (Cl. 235—61)

This invention relates in general to registers or calculating machines, and more particularly to decimal point indicator means for use therewith.

A principal object of the invention is to selectively indicate the proper location of decimal point, or other punctuation commonly used to separate different ordinal portions of a multi-order figure, in accurate physical relationship to the register elements of a machine upon which the figure is visually registerd, so that the over-all visual effect is substantially identical to that of the same figure inscribed in the usual manner.

Another important object is to facilitate selective clearing or visual elimination of any such indication merely in response to a simple wiping or brushing movement of a thumb or finger across the register.

A further important object of the invention is to provide an improved and simplified register window or sight aperture construction in the form of a unitary assembly mounted on a calculating machine independently of its casing and having transparent material sealing the sight apertures for the register elements.

Another object is the provision in such assembly of selectively operable decimal point indicator means which perform the additional function of retaining the transparent material in dust-proof, window-closing position.

A further object of the invention is to provide a decimal point indicator which is disposed interiorly of a machine, is manually operable between active and inactive positions relative to a display opening, and extends through the opening in order to facilitate its direct manipulation from the exterior of the machine.

Another important object of the invention is to automatically numerically indicate the particular ordinal location of any decimal point indicator.

Numerous other objects and advantages of the invention will be apparent as it is better understood from the following description which, when taken in connection with the accompanying drawings, discloses a preferred embodiment thereof.

In the drawings:

Figure 1 is a top plan view, with parts broken away, of a closure means for a window of a machine casing which embodies the features of this invention;

Fig. 2 is a bottom plan view of the closure means, turned end-for-end from its position of Fig. 1;

Figs. 3, 4 and 5 are vertical detail sections taken substantially, respectively, on the lines 3—3, 4—4 and 5—5 of Fig. 2;

Fig. 6 is a detail vertical section taken substantially on the line 6—6 of Fig. 1;

Fig. 7 is an enlarged detail sectional view taken transversely through one of the indicators;

Fig. 8 is an end view of a portion of the accumulator of a register, with parts broken away, showing the manner of mounting the closure means of Fig. 1 and its relationship to the outer casing and the frame plates for supporting the numeral wheels; and Fig. 9 is an isometric view showing two of the decimal point indicators mounted on one of the spring members to illustrate the normal shape of the latter before its assembly with the closure means.

Referring more particularly to Fig. 8 of the drawings, reference numeral 11 indicates in general the outer casing of a register or calculating machine which is provided with a window 12 extending transversely thereof. Interiorly of the casing 11, the machine is provided with a plurality of transversely spaced frame plates 13 in conventional manner for supporting the operating mechanism, including a multi-order accumulator comprising a plurality of indicia-bearing elements which, in he embodiment herein illustrated, consist of the usual numeral wheels 14. As will be understood by those skilled in the art, such a numeral wheel 14 is provided in each denominational order of the accumulator, and those numeral wheels are rotatably mounted in well-known manner upon a shaft 15 extending transversely of the machine and suitably journalled in the frame plates 13.

Closure means, indicated generally by reference numeral 16 and comprising the unitary assembly illustrated in Figs. 1 and 2, is mounted in the manner shown in Fig. 8 for contact with the inner peripheral surface of the casing 11 defining the window 12 to prevent the entry of dust and other foreign matter into the interior of the casing. The window closure means 16 comprises a channel-shaped member 17 which extends transordinally of the accumulator and is interposed between the forward end portions of the frame plates 13 and the casing 11, and is provided with inturned edge flanges 18 and terminates at each end in depending ears 19. Preferably the flanges 18 and ears 19 are formed integrally with this transverse member 17, and the depending ears 19 are each provided with a suitable aperture for deceiving the end portions of the numeral wheel shaft 15. The upper, forward corners of frame plates 13 preferably are cut away to provide a shouldered recess 20 (Fig. 8) to receive the member 17. Thus, the closure means 16 is readily removably mounted upon the machine frame plates 13 and retained in proper position thereon by the frame plates 13 and the numeral wheel shaft 15 entirely independently of, and separately from, the casing 11.

As best seen in Figs. 1 and 2, the channel-shaped member 17 is provided with a plurality of sight apertures 21 extending therethrough and spaced laterally of the machine so as to be visually aligned, respectively, with the several numeral wheels 14 of the accumulator. For the purpose of sealing these sight apertures 21 to prevent dust and other foreign material from entering the casing therethrough, transparent means, preferably in the form of a panel 22 which may be made of cellulose acetate, or the like, is mounted on the lower side of the member 17 between the inturned flanges 18. The closure member 17 also is provided with a plurality of smaller display openings 23 spaced, respectively, between the sight apertures 21 and aligned with the lower portions thereof (Fig. 1). The transparent panel 22 likewise is provided with a plurality of openings 24 coinciding with, but preferably slightly larger than, these display openings 23. It will be appreciated that the transparent means may also comprise a plurality of separate pieces, instead of a single panel, which may be of the same or different colors.

Decimal point indicator means are provided as a part of the closure means 16, which comprise a plurality of decimal point indicators 25 disposed, respectively, in each of the display openings 23. As best seen in Figs. 2 and 9, in the illustrated embodiment of the invention, each of these indicators 25 is in the form of a cylinder rotatably mounted upon one leg of a substantially U-shaped spring which is indicated generally by reference numeral 26. Consequently, there are half as many springs 26 as indicators 25 incorporated in the closure means 16, since each spring functions as a resilient mounting means for two of the indicators 25. Each of these springs 26 preferably is made of piano wire and is formed to assume the configuration illustrated in Fig. 9 before being assembled as a part of the closure means 16. In that normal form, each spring 26 comprises leg portions 27 upon which the indicators 25 are mounted and which are bent toward each other at their upper ends and terminate in reversely bent free ends 28. The lower or transverse part of each spring 26 joining the leg portions 27 is formed to provide a reversely bent extension 29. Each of the inturned edge flanges 18 of the member 17 is provided with a plurality of slots 31 spaced from each other laterally of the member and centrally aligned with alternate ones of the sight apertures 21, and as best seen in Fig. 3, these slots 31 function to receive the extensions 29 and free ends 28 of the springs 26. The various parts are so dimensioned that when assembled as illustrated in Figs. 1 and 2, an indicator 25 will be disposed in each of the display openings 23. Each spring 26 functions not only to rotatably support two of the indicators 25, but also to retain the transparent means or panel 22 in sealing engagement with the inner or lower surface of the transverse member 17. As best seen in Fig. 6, each indicator 25 is somewhat larger than its associated display opening 23, so that only a portion thereof extends through the display opening, and the spring 26 additionally functions to resiliently maintain the indicators 25 in frictional engagement with the marginal portions of the member 17 defining the display openings 23. It will also be appreciated that the indicators 25 will limit and substantially prevent transverse movement of the transparent means 22 if the same comprises a plurality of pieces not in end-to-end abutting relationship.

As previously noted, in the illustrated embodiment of the invention the decimal point indicators 25 are cylindrical in shape. Each indicator 25 preferably is formed of a suitable thermoplastic material with one half being similar in color to that of the outer surface of the transverse member 17 and the other half of a contrasting color. The dividing or junction line of these two differently colored halves extends through the axis of the cylinder and is indicated by the broken line 32 in Fig. 7. Each indicator 25 is provided with an axial bore and a radial slot 33 (Fig. 7) extending outwardly therefrom and coinciding with this color junction line 32. The bore and the radial slot 33 receive a reversely bent insert 34 which extends beyond the cylindrical portion of the indicator and is formed interiorly thereof to provide a bearing portion 35 to accommodate one of the legs 27 of the associated spring 26. This insert 34 preferably is made of metal, such as thin shim stock, and that portion thereof which extends outwardly from the indicator 25 comprises a stop means in the form of a tab 36, as best seen in Fig. 6. When the various parts are assembled for use, the tab 36 will limit rotation of the indicator 25 to approximately 180 degrees by contacting the rear surface of the panel 22 at either side of the associated opening 24 therein. For example, the two indicator members 25 at the left end of Fig. 2 are shown in one position with their tabs 36 at the left side, while the next two indicators to the right thereof in that figure are illustrated as having been rotated approximately 180 degrees to bring their tabs 36 to the right side, which is the same position of the tabs as that illustrated in Figs. 6 and 7.

The two rightmost indicators 25 in Fig. 1 and the two leftmost indicators in Fig. 2, which are the same indicators, are disposed in their active positions, while the other indicators 25 in Figs. 1 and 2 are illustrated in their inactive positions. The two indicators at the right end of Fig. 1 shown in their active positions are those illustrated at the left end of Fig. 2, since Fig. 2 is a bottom plan view of the device which is seen from above in Fig. 1. Consequently, the indicators 25 illustrated in Figs. 6 and 7 are shown in active position, wherein the upper half of each indicator 25 therein illustrated is of contrasting color to that of the upper or outer surface of the transverse member 17. The other or lower half of each of these indicators, as shown in Figs. 6 and 7, is of the same color as the outer surface of member 17 and is inscribed in any suitable manner with an appropriate number 37 for individually indicating the ordinal position of each indicator when the same is disposed in its inactive position.

Thus, as seen by the machine operator, the indicators will be viewed from above and from the front of the machine, as illustrated in Fig. 1. In order to selectively operate an indicator 25 to move the same between its active and inactive positions, it is only necessary to lightly depress the same against the action of its spring 26 and impart a swinging movement with the thumb or finger upon the exposed surface of the indicator to rotate it upon its associated spring leg portion 27. The tab 36 functions to limit such rotative movement and will therefore insure accurate positioning of the indicator in either desired position. When moved to the active position shown by the right-hand pair of indicators in Fig. 1 and those in Figs. 6 and 7, the normally bottom or rearwardly disposed surface portion of each indicator having the contrasting color will have been rotated to an outer or upper position, so that that portion of an indicator 25 in active position which is visible by virtue of its associated display aperture 23 will be immediately noted in a quick visual scanning of the numeral wheels because of its contrasting color.

After the completion of any calculation during which one or more of the decimal point indicators has been used, it is necessary only to brush the thumb or finger lightly across the transverse member 17 in order to insure all indicators 25 being disposed in their inactive positions. With the arrangement herein illustrated, such clearing of the indicators 25 is accomplished with a sweeping motion from left to right of the machine. When disposed in their inactive positions, as illustrated by the indicators 25 shown to the left of the right-hand pair in Fig. 1, each of these indicators will display on its then exposed surface having the same color as that of the outer surface of the transverse member 17 a particular numeral 37 to individually indicate its ordinal position. These position indicating numerals 37 have been found to be very valuable in pointing off the decimal point in multiple operation calculations, such as division and multiplication.

The inserts 34 not only serve as bearings for their indicators 25 to render them freely rotatable, but also prevent removal of the indicators radially from their shaft portions 27 of the springs 26. The springs maintain the indicators in their associated display openings 23 to prevent axial displacement of the indicators on their shafts, as well as insuring that they are retained in set position by frictional engagement with member 17 upon release of downward manual pressure therefrom. Although the indicators 25 are shown herein as cylindrical, it will be apparent that this illustrated form constitutes only a preferred embodiment of the invention, and that any other suitable shape or form may be used, such as a spherical one. Since at least some of the frame plates 13 might interfere with actuation of an adjacent indicator 25, it is preferred that the end recess 20 in each frame plate be further cut away, as at 38 in Fig. 8, to insure clearance for the tab 36 of the adjacent indicator.

It is thought that the invention and many of its attendant advantages will be understood from the foregoing description, and it will be apparent that various changes may be made in the form, construction and arrangement of the parts without departing from the

I claim:

1. In a machine having a multi-order accumulator with a numeral wheel in each order, and cover means, including a member having a sight aperture aligned with each said numeral wheel and transparent means mounted thereon for closing said sight apertures, decimal point indicator means mounted on said member, comprising an indicator disposed between each said sight aperture and a first surface portion of the same color as that of the outer surface of said member and a second surface portion of a contrasting color, said member having a display opening between adjacent said sight apertures, and spring means for rotatably mounting each said indicator for movement between an inactive position, in which only said first surface portion is visible through the ordinally associated display opening, and an active position in which only said second surface portion is visible through such display opening, said indicators being larger than their associated said display openings, and said spring means resiliently engaging said indicators to maintain the same in said openings with a part of each indicator extending through its associated said opening.

2. A machine according to claim 1, wherein said member has inwardly extending side flanges defining a channel for receiving said transparent means, and said spring means are mounted on said flanges and retain said transparent means in engagement with the inner surface of said member to seal said sight apertures.

3. In a machine according to claim 2, numerical indicia inscribed upon said first surface portion of said indicators to individually indicate the ordinal position of each indicator when the same is disposed in inactive position.

4. In a machine having frame plates supporting a shaft for rotatably mounting a plurality of numeral wheels of a multi-order accumulator, decimal point indicator means, comprising a member extending transordinally of the machine with sight apertures therein aligned with said numeral wheels, means engaging said shaft for maintaining said member on said frame plates, said member having inturned edge flanges engageable with said frame plates, transparent means for closing said sight apertures disposed between said flanges, spring means mounted on said flanges for retaining said transparent means in sealing engagement with said member, and selectively operable decimal point indicators rotatably mounted on said spring means between adjacent said sight apertures.

5. In a machine having a plurality of indicia-bearing register elements, a casing therefor with a window aligned with said register elements, and support means disposed interiorly of and separate from said casing for supporting said register elements, closure means for said window, comprising a member mounted on said support means interiorly of said casing with, and in spaced relationship to, said register elements and interposed between the latter and said casing for contacting the inner surface of the casing peripherally of said window said member having sight apertures aligned, respectively, with each of said register elements, transparent means secured to said member for sealing said sight apertures, and decimal point indicator means mounted on said member between adjacent said sight apertures and extending outwardly through said window for selective operation between active and inactive positions.

6. A machine according to claim 5, wherein said member is provided with display openings between adjacent said sight apertures, and said decimal point indicator means comprises an indicator pivotally mounted on the lower side of said member to substantially close each of said display openings and having a portion thereof extending upwardly through said display opening for operation from the exterior of said casing.

7. A machine according to claim 6, wherein each said indicator is larger than its associated said display opening, and spring means for pivotally mounting said indicators and resiliently maintaining the same in frictional engagement with said member.

8. A machine according to claim 7, wherein portions of said spring means underlie and engage said transparent means to retain the same in sealing engagement with said member.

9. A machine according to claim 6, wherein that portion of each said indicator extending upwardly through the associated display opening when in inactive position is the same color as the upper surface of said member and is provided with a numeral for indicating its ordinal position, and a different portion of each said indicator is brought into position to extend upwardly through said display opening, when the indicator is moved to an active position which different portion is of a contrasting color.

10. In a calculating machine having a multi-order accumulator, decimal point indicator means, comprising a member extending transordinally of said accumulator and having display openings therein interposed between adjacent orders of the accumulator, an indicator associated with each said display opening having an indicating portion thereof extending through the associated said opening and manually movable therein from the exterior of the machine between active and inactive positions, and spring means mounted on said member for maintaining said indicators in frictional engagement with said member with said portion of each indicator extending through its associated display opening for manual operation and to restrain said indicators against movement relative to said member.

11. In a calculating machine having a multi-order accumulator, decimal point indicator means, comprising a member extending transordinally of said accumulator and having display openings therein interposed between adjacent orders of the accumulator, an indicator associated with each said display opening and movable therein between active and inactive positions, and spring means mounted on said member for maintaining said indicators in frictional engagement with said member with a portion of each indicator extending through its associated display opening to restrain said indicators against movement relative to said member, each said indicator being rotatably mounted on said spring means for selective movement between active and inactive positions.

12. A machine according to claim 11, wherein that portion of each said indicator extending through its display opening when in inactive position is colored the same as the outer surface of said member, and a different portion of each indicator is brought into position to extend through the display opening, when the indicator is moved to an active position, which different portion has a contrasting color.

13. A machine according to claim 12, wherein said spring means extends axially through each said indicator and the latter is provided with radial slot, and bearing means for each said indicator surrounding said spring means and disposed in and extending through said slot for contact with said member to limit rotation of the indicator and stop it in active or inactive position.

14. A machine according to claim 13, wherein said spring means comprises a plurality of substantially U-shaped springs each having a lower transverse portion interconnecting vertical legs, said springs engaging said member centrally of said lower transverse portions and at the upper ends of said legs, with a vertical leg of each spring extending through a said indicator bearing means.

(References on following page)

References Cited in the file of this patent

UNITED STATES PATENTS

| | | |
|---|---|---|
| 1,208,810 | Martin | Dec. 19, 1916 |
| 1,804,650 | Shipley | May 12, 1931 |
| 1,874,938 | Dunning | Aug. 30, 1932 |
| 2,154,495 | Dahlberg | Apr. 18, 1939 |
| 2,329,190 | Ellerbeck | Sept. 14, 1943 |
| 2,430,575 | Laiho | Nov. 11, 1947 |
| 2,549,512 | Lezius | Apr. 17, 1951 |
| 2,567,133 | Studley | Sept. 4, 1951 |
| 2,585,578 | Niemann | Feb. 12, 1952 |
| 2,615,632 | Machado | Oct. 28, 1952 |
| 2,643,822 | Allen | June 30, 1953 |
| 2,835,440 | Koch | May 12, 1958 |

FOREIGN PATENTS

| | | |
|---|---|---|
| 272,314 | Switzerland | Mar. 1, 1951 |

UNITED STATES PATENT OFFICE
CERTIFICATE OF CORRECTION

Patent No. 2,980,322            April 18, 1961

Emil C. Walker, Jr.

It is hereby certified that error appears in the above numbered patent requiring correction and that the said Letters Patent should read as corrected below.

Column 1, line 19, after "of" insert -- a --; column 2, line 12, for "he" read -- the --; line 34, for "deceiving" read -- receiving --; column 5, line 11, after "and" insert -- having --; line 62, after "window" insert a comma; column 6, line 21, after "position" insert a comma.

Signed and sealed this 24th day of October 1961.

(SEAL)
Attest:

ERNEST W. SWIDER
Attesting Officer

DAVID L. LADD
Commissioner of Patents

USCOMM-DC